(12) United States Patent
Sullivan et al.

(10) Patent No.: US 8,610,622 B2
(45) Date of Patent: *Dec. 17, 2013

(54) FIREARM THREAT DETECTION, CLASSIFICATION, AND LOCATION USING WIDEBAND RADAR

(75) Inventors: Jacob Ryan Sullivan, Portland, OR (US); Daniel J. Hyman, Long Beach, CA (US)

(73) Assignee: Flex Force Enterprises LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/281,296

(22) Filed: Oct. 25, 2011

(65) Prior Publication Data

US 2012/0038505 A1 Feb. 16, 2012

Related U.S. Application Data

(63) Continuation-in-part of application No. 12/426,845, filed on Apr. 20, 2009, now Pat. No. 8,049,659.

(60) Provisional application No. 61/046,365, filed on Apr. 18, 2008.

(51) Int. Cl.
*G01S 13/90* (2006.01)

(52) U.S. Cl.
USPC .......................................................... 342/90

(58) Field of Classification Search
USPC .......................................................... 342/90
See application file for complete search history.

(56) References Cited

U.S. PATENT DOCUMENTS

| | | | | |
|---|---|---|---|---|
| 4,707,697 A * | 11/1987 | Coulter et al. | ............... | 342/25 A |
| 4,837,718 A * | 6/1989 | Alon | ............................. | 702/143 |
| 4,992,797 A * | 2/1991 | Gjessing et al. | ............... | 342/192 |
| 5,061,930 A * | 10/1991 | Nathanson et al. | ............. | 342/13 |
| 5,381,154 A * | 1/1995 | Guerci | ............................. | 342/90 |
| 5,392,050 A * | 2/1995 | Guerci et al. | .................... | 342/90 |
| 5,424,749 A * | 6/1995 | Richmond | ..................... | 342/192 |
| 5,745,071 A * | 4/1998 | Blackmon et al. | ............... | 342/90 |
| 6,069,565 A * | 5/2000 | Stern et al. | ...................... | 340/583 |
| 6,281,841 B1 * | 8/2001 | Nevill | ............................ | 342/424 |
| 6,359,582 B1 * | 3/2002 | MacAleese et al. | ............ | 342/22 |
| 7,450,052 B2 * | 11/2008 | Hausner et al. | ................... | 342/22 |
| 7,492,303 B1 * | 2/2009 | Levitan et al. | ................... | 342/22 |
| 7,652,620 B2 * | 1/2010 | Lee et al. | ....................... | 342/195 |
| 7,747,084 B2 * | 6/2010 | Picard | ............................ | 382/228 |
| 7,768,444 B1 * | 8/2010 | Rourk | .............................. | 342/67 |

(Continued)

OTHER PUBLICATIONS

"Directivity". Antenna-Theory.com web page. Dec. 2, 2008. Accessed Jul. 7, 2012. <http://web.archive.org/web/20081202043122/http://www.antenna-theory.com/basics/directivity.php>.*

*Primary Examiner* — Matthew M Barker
(74) *Attorney, Agent, or Firm* — Mintz, Levin, Cohn, Ferris, Glovsky and Popeo, P.C.

(57) ABSTRACT

An aimed or aiming firearm can be detected before it is able to shoot. Wideband radar signals can be used to identify the barrel of a firearm when the radar antenna and barrel are aiming at or near each other. Signal processing correlates reflected signals to the characteristics of specific firearms of interest, and alerts the user when someone is pointing such a firearm at them. Modern wideband radar systems with fast signal processing speed can enable real-time detection of firearm threats in crowded and cluttered areas before they shoot, which has never before been possible. Related systems, apparatus, methods, and articles are also described.

23 Claims, 3 Drawing Sheets

(56) References Cited

U.S. PATENT DOCUMENTS

| | | | |
|---|---|---|---|
| 2006/0284761 A1* | 12/2006 | Picard | 342/160 |
| 2008/0266084 A1* | 10/2008 | Fisher et al. | 340/540 |
| 2008/0282595 A1* | 11/2008 | Clark et al. | 42/1.01 |
| 2009/0195435 A1* | 8/2009 | Kapilevich et al. | 342/22 |
| 2010/0019948 A1* | 1/2010 | Newham et al. | 342/20 |
| 2010/0079280 A1* | 4/2010 | Lacaze et al. | 340/540 |

* cited by examiner

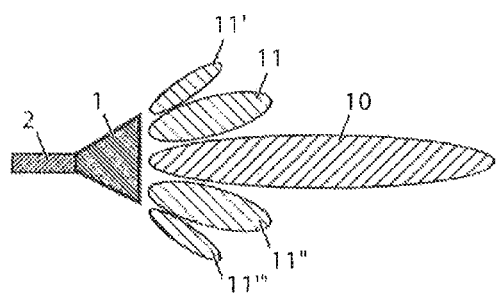
FIG. 1
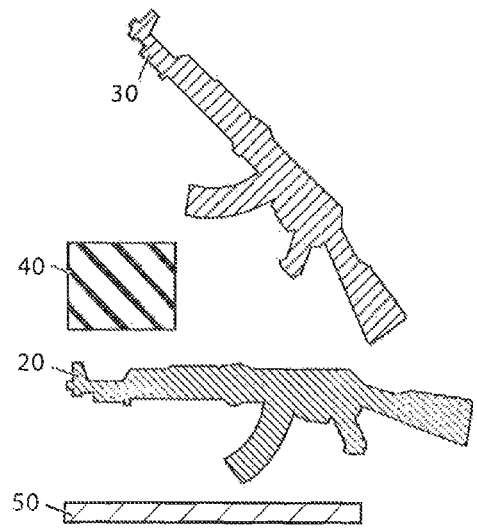
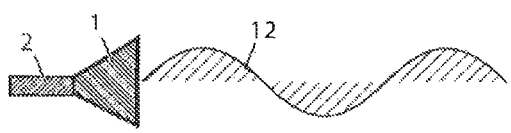
FIG. 2A
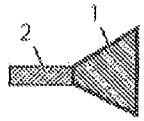
FIG. 2B
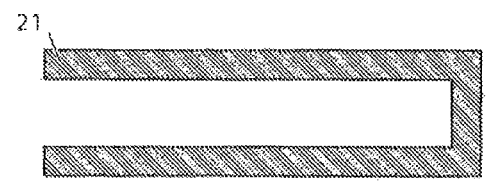
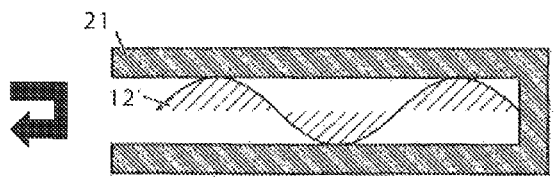
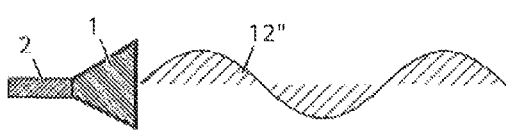
FIG. 2C
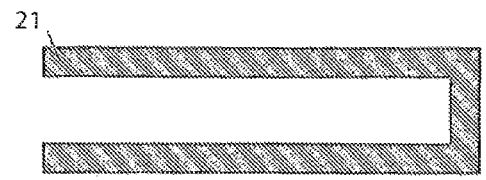

FIREARM THREAT DETECTION, CLASSIFICATION, AND LOCATION USING WIDEBAND RADAR

RELATED APPLICATION

This application is a continuation-in part of U.S. patent application Ser. No. 12/426,845, filed Apr. 20, 2009 which claims the benefit of U.S. patent application Ser. No. 61/046,365, filed on Apr. 18, 2008, the contents of both of which are hereby fully incorporated by reference.

FIELD

The subject matter described herein relates to methods and sensor systems, including but not necessarily limited to the use of wideband radar systems to detect enemies aiming weapon barrels, including those of cannons or firearms (such as for example rifles, machine guns, or pistols), at or near the user.

BACKGROUND

Since the advent of warfare, military leaders have understood the advantage of surprise and confusion. This is clearly evident by the effectiveness and use of snipers, ambushes, sneak attacks, and guerrilla tactics. In addition, military leaders have understood the importance of situational awareness during active combat operation as indicated by the time and resources devoted to combat communication (from the use of flags and trumpets to modern radios) and troop concealment (from the use of smoke, terrain, and camouflage).

The detection, classification, and location of threats is critical to the success of any military operation. Before the advent of modern warfare, military leaders had little access to real-time situational awareness and tactical threat detection beyond the use of scouts and telescopes, and the individual warfighter had no access at all. With the advent of modern warfare came the application of technology to increase situational awareness both before combat (to reduce the effectiveness of enemy snipers, ambushes, and sneak attacks), and during combat (to increase the individual warfighters survivability and effectiveness).

The rapid increase of military technology has brought about the possibility of real-time tactical threat detection and location at the squad level. Examples of some of these emerging technologies include acoustic and infrared shot detection. These electro-optical and acoustic systems have been developed to help triangulate the location of a sniper once they fire. Project Overwatch uses thermal imagers, and new system products, such as Boomerang, use acoustic echolocation to identify the direction and distance of snipers once they fire. These systems greatly improve the speed and effectiveness of sniper response, as friendly forces can protect themselves from the direction of the shooter, and can more quickly identify the shooter location and mount a counterattack. From a counter-sniper perspective, these systems provide significant advantages. Unfortunately, the initial damage done by the shooter is unaffected. The officer, specialist, or materiel still will already have been fired upon by the time these systems are able to assist the tactical warfighter.

Despite the wide-ranging efforts by numerous researchers and product developers including those above, none of the conventional solutions is optimal for identifying and locating enemy combatants in crowded, short-range environments before they are able to attack, nor can they provide precise location in longer-range scenarios after an attack. Detection sensor technologies help identify the presence of people and weapons, but have difficulty detecting intent to harm. Reaction sensor technologies help identify the location and direction from which an attack was launched, but they provide little value or comfort to the victim, nor do they provide sufficient precision to direct other sensor and weapon resources against the attacker. Instead, what forces facing insurgents, snipers, and terrorists desperately need is a sensor technology that can detect the presence and location of a shooter that is poised to strike, and the precise location of a shooter immediately after an attack. This sensor system must then alert the user in a timely manner so that defensive measures can be undertaken and plans for counterattack initiated immediately.

SUMMARY

In one aspect, a method of weapon threat detection includes transmitting radar signals towards a potential threat, receiving reflected radar signals that have been reflected from the potential threat, and employing signal processing to determine if a weapon barrel is pointed at or near a target of interest by a potential or continuing threat. If so, the weapon barrel is considered to be a weapon threat and an alert is provided.

In an interrelated aspect, a weapon threat detection system includes an outbound antenna apparatus that transmits an outbound radio frequency signal toward a potential threat and an inbound antenna that receives an inbound reflected radio frequency signal from the potential or continuing threat. A processor analyzes the inbound reflected radar signals to determine whether the threat includes a weapon barrel pointed in the direction of the receiving antenna apparatus.

In a further interrelated aspect, radio frequency signals are transmitted towards a zone of interest containing a plurality of firearms from a first location and radio frequency signals reflected from the zone of interest are received. The received radio frequency signals are compared to a library of radio frequency signatures and/or patterns for a plurality of different firearms to identify firearms in the zone of interest. It is then determined using the received radio frequency signals whether the identified firearms in the zone of interest are aimed at the first location or whether they are aimed at a different location. Data characterizing at least one firearm in the zone of interest can then be provided.

In some variations one or more of the following can optionally be included. The processed signal can optionally be compared to a library of one or more pre-characterized weapon threats to identify whether or not a weapon threat is detected. The transmission of the transmitted radar signals can optionally be made with high directionality greater than about 10. The transmitted radar signals can optionally cover a range of frequencies that can be propagated down one or more firearm barrels. The received radar signals can optionally have variances in phase and amplitude with both time and frequency due to the reflections associated with the specific waveguide characteristics of a set of weapon barrels. The set of weapon barrels of interest can optionally include one or more barrels of "small arms" firearms, such as for example shotguns, pistols, machine guns, other "infantry" weapons, 5.56 mm rifles, 7.62 mm rifles, and .50 caliber rifles. The alert signal can optionally include information that describes the direction of one or more weapon barrels detected. The alert signal can optionally include information that describes the range of one or more weapon barrels detected. The signal processing can optionally additionally resolve and identify reflections associated with the specific lengthwise radiating antenna characteristics of a set of weapon barrels and other firearm physical characteristics. The antenna used for transmitting and/or receiving the radar signals can optionally have a directivity characteristic between 100 and 100,000.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein can provide, among other possible advantages and beneficial features, systems, methods, techniques, apparatuses, and article of manufacture for detecting a threatening firearm that is aimed at or near a radar system configured to resolve the specific characteristics of that firearm. Implementations of this subject matter could provide critical advance warning of sniper attacks on tactical warfighters and supply convoys before they occur, which would save lives and materiel. Received radar signatures can be compared against specific waveguide and antenna characteristics of firearms and firearm barrels commonly employed by snipers that may be in the area. Unlike conventional imaging methods providing potential weapon detection benefits, the present subject matter can in some implementations be used in a manner in which alerts are provided only when such weapons are aimed at or near the radar antenna. This can eliminate many of the potential false positives of detecting weapons in areas that contain a large number of armed non-combatants or friendly forces. This feature can be quite valuable in providing heightened effectiveness and resource allocation efficiency, as well as for reduced casualty rates among non-combatants and friendly forces.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed embodiments. In the drawings, FIG. 1 is a schematic illustration of a radar antenna directed at four different types of typical targets in a cluttered radio environment;

FIG. 2A is a schematic illustration of a radar antenna transmitting a signal towards the open mouth of a firearm barrel treated as a short-circuited circular waveguide;

FIG. 2B is a schematic illustration of a radar antenna waiting as a signal propagates down the firearm barrel and is reflected at the short circuit;

FIG. 2C is a schematic illustration of a radar antenna receiving a signal that has been reflected from the waveguide interior of a firearm barrel;

DETAILED DESCRIPTION

Figure 3:
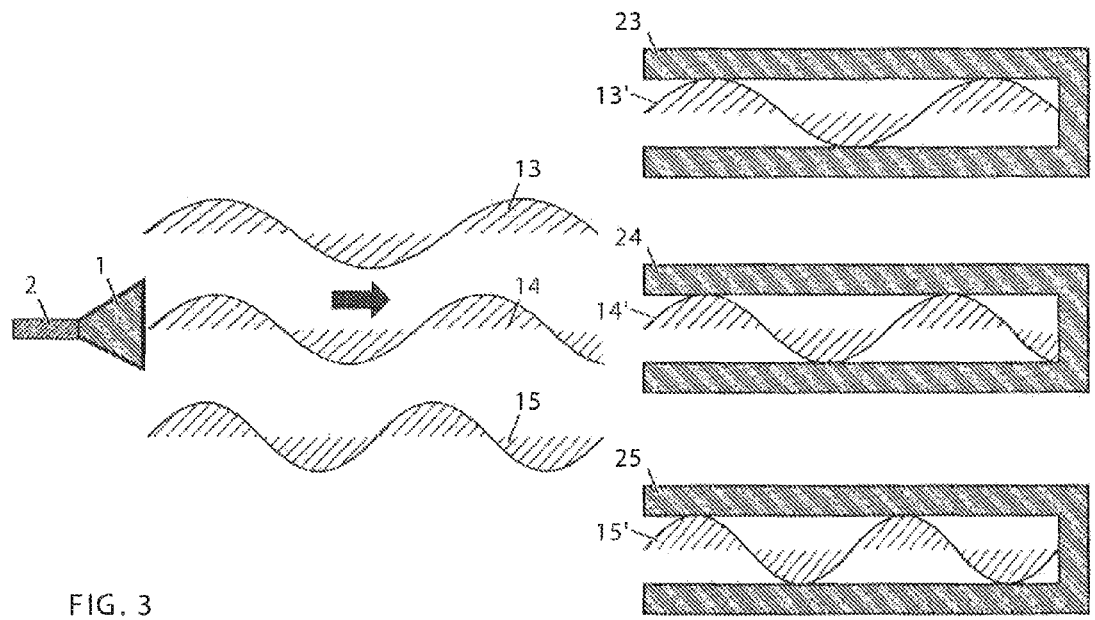
FIG. 3 is a schematic illustration of a radar antenna transmitting multiple frequency signals into the waveguide interiors of a firearm barrels in both resonant and anti-resonant characteristics.

The subject matter described herein can provide new sensing techniques and systems for improved threat detection and force protection. Counter-sniper and counter insurgency missions and operations of all types can be improved by employing the subject matter. Additional benefit can be gained by combining with other passive and active sensor technologies, and deploying trained counter-insurgency personnel in areas of heightened risk.

Existing limitations of conventional methods can be overcome by identifying threatening firearms and other weapons with barrels as they are aiming. Conventional personnel detection and weapon detection imaging systems help identify the presence of individuals and weapons, but they do little to predict intent or usage. Conventional post-shot location sensor systems do not protect the first target of a concealed attacker, nor do they give predictive warning of any kind. The methods provided herein accomplish both location and intent before the first shot is fired, giving tactical warfighters and operations personnel a critical advantage when facing enemy snipers, insurgents, or ambushes. Even when used in conjunction with post-shot systems, the methods provided herein provide greatly improved precision of location and identification of enemy combatants aiming weapons at or near its antenna.

According to various implementations of the currently disclosed subject matter, a wideband radar system can be used to detect weapon barrels while they are aiming at or near its antenna. Although there are a number of different weapon types that have barrels (including but not limited to cannons, firearms, mortars, and rocket tubes), these are hereafter defined by the general term firearms in the context of the present subject matter. These weapons, insofar as they are aimed at or near the radar system antenna, are herein referred to as firearm threats. Furthermore, in this subject matter, a weapon barrel is defined as the entire projective cavity for a given weapon, which may include the physical weapon barrel itself, as well as the chamber, and a round or other ammunition which may or may not be chambered or otherwise ready for firing.

Firearm threats are distinguished from detectable weapons that are not aimed at or near the radar system antenna, which are referred to herein as non-threatening firearms. As a practical matter, such weapons may not technically be firearms by other industry-recognized definitions. Also as a practical matter, those weapons may actually represent a near and immediate threat to the radar system user, other friendly forces, or materiel of value, either by aiming in a non-detectable manner, or by being configured in a manner that prevents or complicates detection. The following description first discusses the functional means by which a firearm threat can be detected by employing radar systems, then continues with details of a specific implementation of this subject matter.

A firearm threat detection method can in some implementations identify and locate an immediately threatening firearm, with the goal of increasing the safety and security of allied personnel and materiel in regions of conflict. There are a number of general concepts in conventional threat detection sensors, whereby a sensor could aid in the detection, location, and alerting of the user to the presence of concealed enemy personnel, firearms, or the direction and range of an attacker once a shot is fired.

Enemy personnel detection systems and methods have been highly sought after for decades due to the military effectiveness of sniper attacks and ambushes. Systems identifying the existence and location of persons are commercially available and can be effective even when a target is ostensibly hidden in foliage, buildings, ruins, or darkness. Personnel location sensors do not differentiate, however, between threatening and non-threatening personnel in an effective manner, so this technique is of limited value in an inhabited region where there are many non-combatants but few enemies.

One type of firearm detection method is to use an imaging system to detect radar signatures to identify and locate firearms that may be potential threats. Such a system detects the presence of specific types of weapons in the region, in some up-and-coming technologies behind foliage, doors, and other physical and/or visual obstructions. These methods and systems, once mature, may someday aid greatly in the identification and location of firearms, although they cannot provide feedback regarding the intent of the firearm owner. These sensors do not determine whether or not the firearm is present as an immediate threat to friendly forces. This is a significant problem in many developing countries, which can have high rates of civilian ownership of weapons that are similar to those used by enemy combatants.

Conventional firearm threat detection methods generally are capable of responding to a shot being fired. These methods use thermal, optical, or sonic sensors to identify the presence of a shot, locate the origin of the shot, and then alert and inform the user. Systems employing these methods can be accurate in their analysis of incoming attacks, and expedite response time, but they do not provide any warning of the presence of a firearm or the intent of its user before they shoot. An initial well-aimed shot from a concealed attacker is often lethal to personnel or highly destructive to materiel, so significant damage is usually already done before the sensor activates and any response commences. In addition, sonic-based sensors have limited precision in identifying range and location of attackers several hundred meters away and farther, and this limitation reduces the ability for precise and timely response.

The subject matter described herein provides advantages over existing firearm threat detection methods because it is able to detect the presence of a firearm when it is used to threaten the sensor user or a target nearby. This detection can occur before the shot is fired, making it superior to the post-shot detection methods. Additionally, detection can occur at relatively short range in highly populated and highly cluttered RF environments. Additionally, detection and identification of threats post-shot can be made with substantially greater precision at long range.

The firearms that currently pose the largest threats to troops in engagements in Afghanistan and Iraq have a fairly narrow range of barrel characteristics. Most insurgent attacks are made using either an AK-series firearm or one of a set of 7.62 mm and .50 caliber rifles. The ubiquitous AK-47 and its modern variants and clones, found in staggering numbers worldwide, is a highly effective weapon using 7.62 mm ammunition with a cartridge that is 39 mm in length. Typical 7.62 mm rifle barrels have a number of different common lengths, with AK-47 barrels typically 414 mm long, having 4 right-hand turned rifling grooves at one turn per 235 mm. These types of firearm barrels will most commonly be manufactured of either 4140 chrome-moly steel or 416 stainless steel. These characteristics are important as they define the performance characteristics when the firearm barrel acts as both a waveguide and as an antenna for RF signals.

The range of the firearm threat detection method can be highly dependent on the RF power and signal processing capabilities available to a radar system employing these methods. This is because a system employing these methods must discern the firearm barrel characteristics from what will typically be a highly cluttered RF environment. An example is important to aid a designer in developing a system with a highly relevant and feasible set of operating capabilities. An RF signal travels in air at nearly the speed of light ($c \sim 3 \times 10^8$ m/s), so a radar system employing these methods out to a range of hundreds of meters only has a few microseconds of delay between when a signal is transmitted and when the most relevant reflected signals are returned. One microsecond, for example, would be enough time to permit a primary reflection from a target about 150 meters away, which is a long enough range to encompass the majority of firearm attacks.

In the radar range equation, increasing range of the target reduces the power level of the received signal to the fourth power. Increasing range dramatically increases the power required by the system or equivalently increases the required sensitivity of receive electronics and signal processing. Modern radar signal processing techniques can effectively lower the minimum detectable signal, and pulse radar techniques using integration of multiple received signals can also increase effective range. Both of these system design techniques are appropriate for use in this subject matter by those skilled in the art. Even with these improvements, however, the signals to be detected are of very low power level, and must be identified out of a cluttered radar environment, so the subject matter described herein is intended to enable firearm threat detection only at relatively short ranges, or with limited field of view at longer ranges. This limitation enables receiver detection, pulse integration, signal processing, and target identification of the small signals reflected from firearm barrels without having to rely on cost-prohibitive high transmit powers and extremely sophisticated receiver and signal processing electronics.

As an instructive example of range calculation, consider a radar system operating at 25 GHz with an antenna gain of 30 dB and a transmitter power of 500 W. It is desired to detect a signal from the end of a 7.62 mm rifle barrel with an electrical equivalent cross-section of only 46 mm$^2$, using a radar system receiver with a minimum detectable signal of −110 dB. Using the radar range equation for an uncluttered environment without pulse integration or signal processing, the maximum range of detection for this example is only 120 m. A cluttered radar environment may be resolved in some implementations using pulse integration and/or signal processing techniques in order to achieve detection of firearm barrel waveguide characteristics at ranges of appropriate and significant benefit.

A firearm threat detection method according to some implementations of the current subject matter could be used in radar systems transmitting low to moderate RF powers (for example, between 1 W and 1 kW) using high gain antennas (in some examples, at least 20 dB) and with an effective maximum operable range of between approximately 20 m and 200 m in a cluttered RF environment such as an urban area. This effective and operable range might be considerably longer in a less cluttered area such as a rural area, or in an area dominated by foliage rather than metallic and other mineral matter. Such radar system characteristics could be readily applied to portable and/or vehicle-mounted firearm threat detection systems. It is further recognized that applications demanding opposing requirements of lower powers and longer operable range in a system employing these methods may require higher levels of radar receiver sensitivity, different pulse shaping techniques, and/or more advanced receiver hardware and signal processing techniques than those suggested herein.

Throughout this description, possible physical and electrical characteristics for elements of a system employing methods according to the subject matter described herein have been suggested. An illustrative example of the current subject matter includes detection of AK-47 variant rifles with unmodified 4140 steel barrels. The current subject matter is discussed in regards to this example. However, it will be readily understood from the following description and the figures that a wide range of other weapons can be detected in a similar manner by modifying various settings and/or signal processing techniques, inputs, or algorithms.

A system employing one or more implementations of the current subject matter can include elements for directing the antenna and signal, for detecting reflected signals, and for processing the detected signals to resolve the presence of firearm threats. While reference is made to radar, other bands of radio frequency signals can also be utilized. FIG. 1 is a schematic illustration of a radar antenna 1 transmitting a highly directed signal towards four types of targets 20, 30, 40, 50 that might be typical in a cluttered radio environment. As shown in FIG. 1, a radar antenna 1 enables the transmission and reception of RF energy in a highly directed manner. FIG. 1 shows the radar antenna with a schematically illustrated antenna pattern. The radar antenna 1 is connected to a radar feed 2 that further attaches to the rest of the radar transmit and receive electronics (not shown). The radar antenna 1 will have radiating and receiving characteristics defined by its antenna pattern, and this antenna pattern will typically be comprised of a primary antenna beam 10 and one or more sidelobe beams, which in are shown in FIG. 1 as a first sidelobe 11, a second sidelobe 11', a third sidelobe 11", and a fourth sidelobe 11'''. In a well-designed, highly-directed radar antenna, the primary antenna beam 10 will have a high level of gain, defined as being greater than ten, and all of the sidelobes 11 will have a comparatively low level of gain, defined as being less than 5% of the gain of the primary antenna beam 10. It is expected that multiple polarizations of incoming radar signals (e.g., both horizontal and vertical polarizations, or both clockwise and counter-clockwise polarizations) would each be received by a well-designed antenna with a high level of directivity and gain, and have low sidelobes as defined above.

In FIG. 1, the radar antenna is directed at a collection of objects, which includes a threatening firearm 20 that is aimed at the radar antenna 1. The collection of objects additionally includes a non-threatening firearm 30 that is not aimed at the radar antenna 1, and, while potentially of interest, is not considered to be an immediate threat in this subject matter. The collection of objects is further comprised of a cluttering antenna equivalent 50 and a cluttering object 40. The current subject matter enables resolution of the threatening firearm 20 from the non-threatening firearm 30 and other types of objects in the directed field of view.

The radar antenna 1 may be manufactured of a wide variety of materials using a wide variety of architectures and designs in accordance with the state of the art in radar antenna design and manufacturing technologies. The threatening firearm 20 and the non-threatening firearm 30 are likely to be manufactured of a set of materials that includes one or more types of steel, as well as a variety of other metals, plastics, and woods in accordance with the state of firearm design and manufacturing of the region of conflict. The cluttering antenna equivalent 50 and cluttering object 40 can encompass a wide range of objects that could potentially be manufactured of almost any material, with particular interest given to those objects manufactured of steel and other metals and minerals. These materials are most likely to provide the types of radar reflections of interest to this subject matter, in that they must be sorted through and sifted out in order to resolve a threatening firearm 20.

The size ranges of radar antennas 1 used with the current subject matter can in some implementations be in the range of approximately 10 $cm^2$ to 100 $m^2$. This range can include sizes that are appropriate for man-portable, vehicle-mounted, and fixed asset platforms. The directivity of the primary antenna beam can in some implementations be in a range of approximately 10 and 100,000, which covers the range of typical radar antennas according to the state of the art. The barrel diameters of the threatening firearm, non-threatening firearm and cluttering antenna equivalent elements can optionally be in the range of approximately 2 mm and 200 mm, which covers the range of typical firearms and other vehicular threats of relevant interest including but not limited to cannons, mortars, rockets, and rocket-propelled grenades. The sizes of other clutter objects can be any size and shape, as might be expected in the widely varying environments of urban, suburban, and rural engagements.

The barrel of a typical firearm is, in essence, a hollow tube manufactured out of metal, usually open on one end, and closed on the other where the round, chamber, and firing mechanism is typically configured. Such an object may appear to one skilled in the art of RF engineering to be similar in configuration to a circular waveguide, a type of transmission line. One critical defining characteristic of a waveguide is the cutoff frequencies for the various modes of electromagnetic wave propagation. Circular waveguides are capable of propagating both transverse electric (TE) and transverse magnetic (TM) modes of propagation, and these various modes are noted by subscripts that define the circumferential and radial variations in the traveling waves of electromagnetic energy, also called wave numbers.

The lowest-frequency mode of propagation supported by a circular waveguide is the $TE_{11}$ mode, where the electromagnetic fields propagate in a nested spherical shape inside the waveguide. This is the generally the primarily employed mode of circular waveguide propagation, as the propagation characteristics are well-behaved with low loss. The second lowest-frequency mode of propagation is the $TM_{01}$ mode, wherein the electromagnetic fields propagate in a folded toroidal shape inside the waveguide. There are also a number of other higher frequency modes supported, but these are typically avoided in practice. RF signals of frequencies lower than the $TE_{11}$ cutoff frequency will not be supported by the waveguide, and in fact will not launch into the waveguide any appreciable distance. RF signals of the $TM_{01}$ mode cutoff and higher will have multiple transmission characteristics available to them, so the presence of higher modes (or lack thereof) may help identify specific barrel characteristics.

As an example, the $TE_{11}$ and $TM_{01}$ cutoff frequencies can be calculated for a typical AK-47 rifle barrel. For an air-filled metallic waveguide, these frequencies are entirely dependent on the diameter of the barrel opening, which is 7.62 mm. The $TE_{11}$ mode cutoff frequency is 23.071 GHz. The $TM_{01}$ mode cutoff frequency is 30.139 GHz. Therefore, for frequencies between 23.071 GHz and 30.139 GHz, an AK-47 rifle barrel as described above will tend to act as a waveguide that propagates only the $TE_{11}$ mode.

Another critical defining characteristic of a waveguide is the power loss experienced by an RF signal traveling along the waveguide itself. Using the example of an AK-47 barrel made of 4140 cobalt steel, the attenuation characteristics can be calculated using standard equations used by those skilled in the art. Assuming a typical resistivity of $222 \times 10^{-9}$ Ohm*m for this material and a relatively clean interior barrel surface, an AK-47 rifle barrel has an interior waveguide conductor loss coefficient $\alpha_c = 0.3397$ calculated at 25 GHz. Assuming typical barrel length of 414 mm, this means the signal will decay approximately 1.22 dB from the open end of the barrel to the shorted end where the round would be chambered. A reflected signal will similarly decay another 1.22 dB back to the opening, for a total estimated reflected signal decay of only 2.44 dB at 25 GHz. This calculation shows that the example rifle barrel is, indeed, a fairly well behaved, relatively low-loss waveguide in the frequencies of interest to this subject matter. An examination of other common firearm barrel materials, geometries, and frequencies of relevant interest by those skilled in the art yields similar findings.

In some implementations, a library of radio frequency signatures or patterns can be empirically derived or electromagnetically modeled for a plurality of objects of interest (e.g., firearms, etc.) so that received radio frequency signals can be compared to objects characterized in the library in order to determine whether the objects are present in a particular zone. As used herein, the term pattern can refer to a combination of characteristics of fragments/portions of a signature. Stated differently, a signature defines a waveform that completely or substantially matches a specific object of interest (e.g. an AK-47) while a pattern defines a match to a category of objects of interest (e.g. 7.62 mm weapons). The library can also include data characterizing directionality of the objects (i.e., whether an object is pointed at a particular location). The received radio frequency signals can be modified, harmonized, and/or analyzed to reflect factors that can be relevant to identification, such as distance.

In some implementations, radio frequency patterns of objects of interest can be used to recognize the presence of a type of object, though not necessarily an exact definition of an object. Firearm weapon barrels will exhibit identifiable features, such as waveguide resonance and polarization differences, which can signify the presence of a threatening firearm which might not be present in a library of characterized firearms and variants. This is analogous to the way in which face-recognition software can identify the presence of a face in an image due to common patterns (e.g., two eyes, a nose, mouth, chin, and hair), although it may not identify which person the face belongs to.

A critical defining characteristic of a firearm barrel is its length, which can be detected using radio frequency signals as described herein. In one example, frequencies that are characteristic of a fixed length of lossy transmission line can be identified, where the transmission line is the steel circular waveguide of the barrel, and the length is the distance from the mouth of the barrel to a chambered round in the interior. The boundary condition of a chambered round presents an imperfect short-circuit condition for the waveguide. FIG. 2A is a schematic illustration of a radar antenna 1 transmitting a signal 12 towards the open mouth of a firearm barrel 21. The radar antenna feed supplies a radar pulse to a radar antenna 1, which then directs it into a transmitted radar signal 12. The transmitted radar signal 12 propagates towards the open mouth of the firearm barrel waveguide 21. Under the right conditions including, but not limited to, an appropriate frequency, power level, aim, range, and directivity, some of the electromagnetic energy from the transmitted radar signal will enter the mouth of the firearm barrel 21 and propagate down the barrel as a waveguide.

FIG. 2B illustrates the signal reflecting from the short circuit boundary condition posed by the metallic chambered round at the end of the barrel. At the closed end of the firearm barrel, where a round may be chambered, and where the firing mechanism for the firearm may be situated, the waveguide may transition into an imperfect metallic short. When a signal propagating down a waveguide encounters a short, it is typically reflected back down the opposite direction. After entering the waveguide, propagating down the waveguide, and reflecting from the shorted end, the RF signal will have transformed into a guided radar signal 12', heading back towards the mouth of the firearm barrel 21.

In FIG. 2C, the signal 12" has already been reflected from the short circuit, propagated back down the waveguide towards and out the mouth of the firearm barrel 21, and back out towards the radar antenna 1. As the returned RF signal 12" transmits back out into the air, it returns to typical transmission characteristics for radio propagation rather than confined waveguide propagation. A transformed and greatly reduced power level of returned radar signal 12" is then finally received by the radar antenna and coupled into the radar antenna feed into the receive electronics of the radar system. The entire travel path of signal transmission to signal reception may have taken only a few microseconds or less.

At specific frequencies representing integer multiples of half wavelengths, the length of the firearm barrel can appear to be a short-circuited half-wavelength line. FIG. 3 is a schematic illustration of a radar antenna 1 transmitting multiple signals 13, 14, 15, each being represented by a sine wave of different periodicity in the illustration. An antenna feed connected to a radar antenna is shown transmitting a first frequency signal 13, a second frequency signal 14, and a third frequency signal 15. These three signals are transmitted towards a first waveguide 23, a second waveguide 24, and a third waveguide 25. A portion of the first frequency signal 13 propagates down the first waveguide 23 and gets reflected at the short, resulting in a first reflected signal 13'. Similarly, a portion of the second frequency signal 14 propagates down the second waveguide 24 and gets reflected at the short, resulting in a second reflected signal 14'. In addition, a portion of the third frequency signal 15 propagates down the third waveguide 25 and gets reflected at the short, resulting in a third reflected signal 15'.

In FIG. 3, the first signal 13 is illustrated to represent a multiple of a half wavelength of the length of the first waveguide, or 3/2 wavelength to be exact. The second signal 14 is illustrated to represent a half-wavelength multiple of a quarter wavelength of the length of the second wavelength, or 7/4 wavelength to be exact. The third signal 15 is illustrated to be a higher-order multiple of a half wavelength, or 4/2 wavelength to be exact. These three frequencies of these three signals were selected to illustrate that relatively small differences in frequency can result in very different characteristics of reflected signals, as the first reflected signal 13 and third reflected signal 15 would have characteristics very different from the second reflected signal 14.

It may be instructive to consider an example firearm for calculations. An AK-47 barrel is 414 mm long, so will have resonances at approximately 362 MHz, and every multiple of 362 MHz. If one considers only the resonant frequencies supported by the waveguide propagation limits, then the lowest resonant frequency supported by the barrel will be a $TE_{11}$ mode wave at 23.188 GHz, with additional resonances occurring every 362 MHz up to and including 30.797 GHz. Higher frequency resonances have the potential to excite $TM_{01}$ (and other higher-order) modes. As known to those skilled in the art, these higher order modes have much lower resonator quality factors, so will be harder to detect and are therefore of reduced interest in many implementation of the current subject matter.

At specific frequencies representing a quarter wavelength and multiples of half wavelengths larger than a quarter wavelength, the length of a firearm barrel will appear to be a short-circuited quarter-wavelength line. This will create an anti-resonance, with characteristics that can also be readily calculated. An example frequency of anti-resonance is also illustrated schematically in FIG. 3 with the second reflected signal 14. These frequencies are also of interest, as they will appear as nulls for purposes of waveguide propagation into the barrel. As expected, these nulls will be located in the frequency spectrum mid-way between each of the half wavelength resonances.

In the current subject matter, these resonances and anti-resonances are specific to the characteristic diameter and length of the firearm barrel. A broadband radar signal, whether instantaneously broadband or "chirped", will have different frequencies reflect differently for the resonant and anti-resonant signals, in terms of amplitude, phase, and contributions from noise. These waveguide-specific reflection differences will be different than the frequency response differences associated with other common objects of radio clutter, such as flat, curved, or irregular metallic and mineral surfaces.

Figure 4:
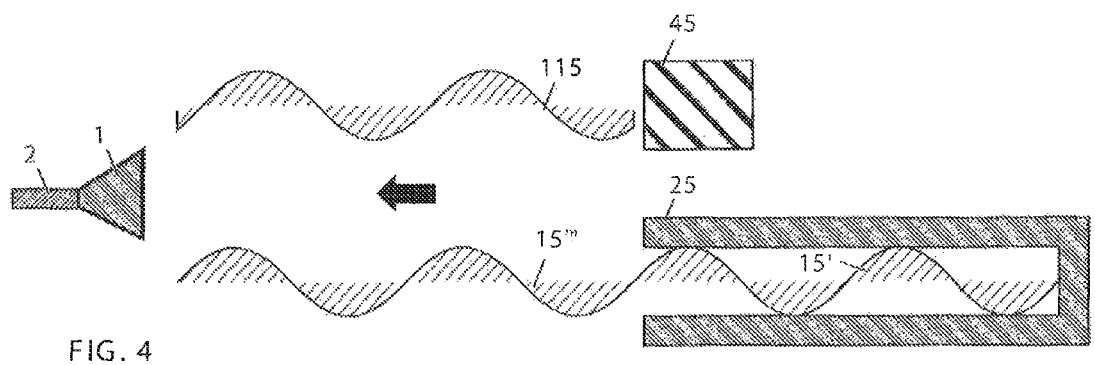
FIG. 4 is a schematic illustration of a radar antenna receiving signals reflected back from a clutter object and from the waveguide interior of a firearm barrel.

An example of clutter object differentiation is schematically illustrated in FIG. 4, which continues describing the process of signal reflection and receiving. The third reflected signal 15' from a third waveguide 25 leaves the open mouth of the third waveguide 25 and propagates through free space. This modifies the third reflected signal 15' which becomes a third received signal 15" as it returns to the radar antenna. A reflective clutter object 45 will reflect a transmitted radar signal in a manner that results in a reflected clutter signal 115, where the modifications to the signal will be very different than those of the third received signal 15". The reflected clutter signal can be filtered or ignored preferentially through signal processing techniques. When a positive match corresponding to a specific firearm barrel size (aimed at or near the antenna) is identified and validated as being a likely threat, the user can be alerted, and the user can also be provided a description of the specific firearm detected as well as its location, as all of this information may be extracted from the received signals.

Figure 5:
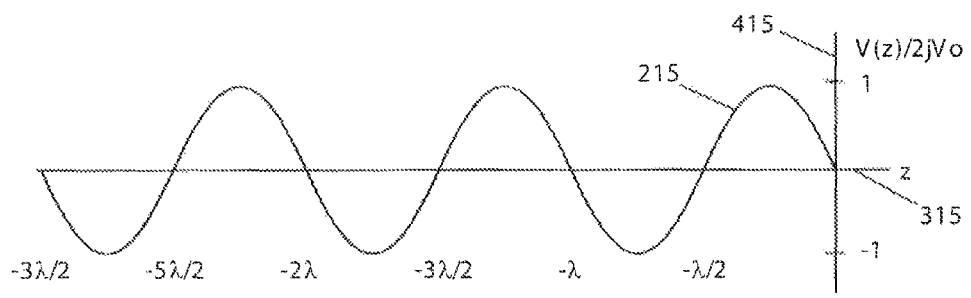
FIG. 5 is an illustration of the voltage level on the inside surface of the waveguide interior of a firearm barrel while a signal is simultaneously transmitted into the mouth of, propagated within, and reflected from the closed portion of said barrel.

The short circuit condition will have a voltage distribution and resonance characteristics that can be calculated or modeled by those skilled in the art. FIG. 5 illustrates an example of such a voltage distribution at resonance, ignoring the small losses intrinsic to the waveguide. The resonance voltage 215 is the level of electrical voltage differential present at the interior surface of the metallic waveguide. The axes of FIG. 5 are the distance along the barrel 315 and the normalized voltage level 415. This normalized voltage level 415 would be measurable along the interior of the firearm barrel, and can be maintained in a steady state condition as long as the transmitted radar signal illuminates the firearm in an unchanging radiation environment relative to detection speed.

Figure 6:
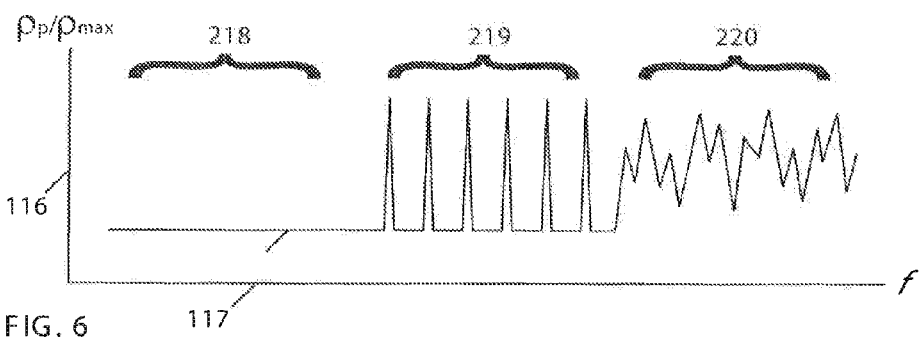
FIG. 6 is an illustration of the resonant and anti-resonant frequencies with wave propagation characteristics supported by the waveguide interior of a firearm barrel.

FIG. 6 illustrates a set of resonant and anti-resonant frequencies used to distinguish the firearm barrel from other objects or clutter that does not present an imminent threat. The horizontal axis of FIG. 6 is the signal frequency 117, which is used to define a range of radar signals that may be used in the application of the methods of this subject matter. The vertical axis of FIG. 6 is the propensity to propagate 116, which describes the likelihood that a given signal of a particular signal frequency will be able to propagate down the firearm barrel and be reflected and modified in the manner discussed in this subject matter. The main curve of FIG. 6 is one example propagation propensity curve 17, which describes the set of resonant and anti-resonant frequencies associated with a single hypothetical example firearm barrel according to its diameter and length. There are three regions of interest in the propagation propensity curve, including a below TE cutoff range 218, a resonance and anti-resonance range 219, and a higher-order mode range 220. In the below TE cutoff range 218, the firearm barrel will have characteristics similar to a metallic object that is defined by its exterior dimensions. The mouth of the barrel and interior waveguide properties will not significantly affect the characteristics of a reflected signal. In the resonance and anti-resonance range, the peaks are located at the resonant frequencies previously discussed, and the valleys will be located at the anti-resonant frequencies. The higher-order mode range contains a varying propensity for signals to propagate and be reflected and modified according to this subject matter, in that multiple modes of less-efficient propagation may be excited at these higher frequencies, which may increase the complexity of signal processing required to identify a given firearm threat.

The length of a firearm barrel can also serve as an antenna, which will radiate or re-radiate specific frequencies of RF signals that can be detected in the context of this subject manner. This concept by itself can be applied to utilize the firearm barrel of friendly forces to serve as an impromptu or camouflaged radio antenna, or for radio imaging of concealed weapons that may or may not be aiming at a target of interest. When used in conjunction with the waveguide detection methods in the present subject matter, however, this additional detectable RF characteristic can provide validation that metal objects of the appropriate radiation characteristics for firearm barrels of interest are present in or near the region under examination.

Figure 7:
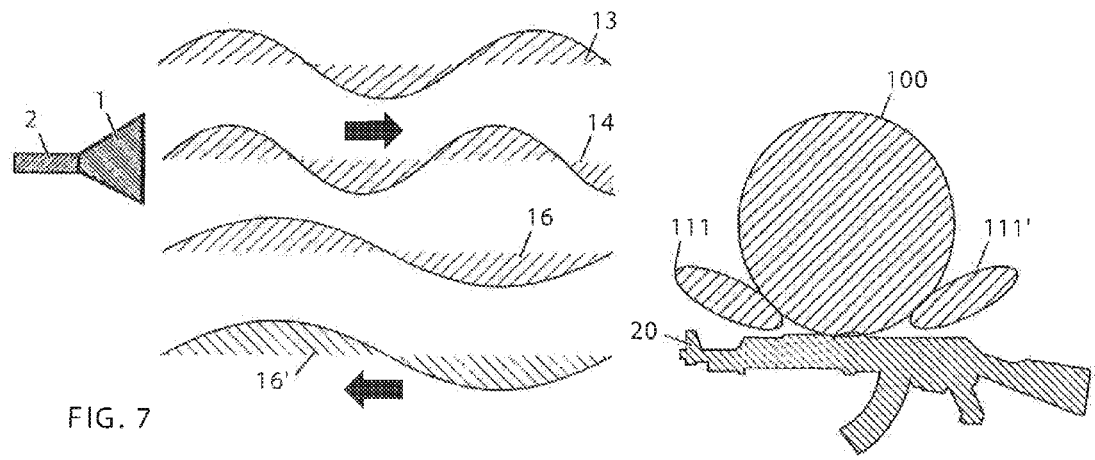
FIG. 7 is a schematic illustration of a radar antenna transmitting and receiving signals associated with the firearm barrel waveguide characteristics as well as the external firearm antenna radiation characteristics.

FIG. 7 illustrates a radar feed and radar antenna transmitting and receiving signals associated with the firearm barrel waveguide characteristics as well as the external firearm antenna radiation characteristics. A radar antenna 1 is illuminating a threatening firearm 20 with a transmitted radar signal further comprised of many frequency bands of signals, including a first frequency signal 13, a second frequency signal 14, and a radiating frequency signal 16. The position of the threatening firearm is such that the first frequency signal and second frequency signal are able to propagate down, reflect within, and be modified by the firearm barrel, and return to the radar antenna as a first reflected signal and a second reflected signal as previously described. In addition, the radiating frequency signal interacts with the exterior geometry of the firearm 20 as an antenna element itself with its own firearm radiating antenna beam 100, first firearm antenna sidelobe 111, and second firearm antenna sidelobe 111'. The radiating frequency signal is modified and returned to the radar antenna 1 as a radiating reflected signal 16', a term that is consistent with the terminology used to describe other signals that interact with the firearm barrel as a waveguide.

As an example, a 414 mm AK-47 barrel would have broadband resonances at 362 MHz and at integer multiples of 362 MHz. In this context, the external surface of the firearm barrel is acting in a similar manner as a half-wavelength dipole antenna. Such antennas typically have directivity in the broadside direction of around 1.6, so they can be detected off-axis, but at a reduced level. The theoretical radiated power in the axial direction (i.e., the case of the firearm aiming directly at the antenna) is zero, but multipath effects will typically result in some signal being returned. Locating direction and range of the firearm is complicated by multipath signals, but signal processing techniques can mitigate these problems and enable this feature to still provide value to certain implementations of the firearm threat detection subject matter described herein.

A radar system employing the current subject matter can operate in a frequency range of interest for identifying the waveguide and/or radiating antenna characteristics of the firearm barrel. The radar antenna generally has a sufficiently high gain to give the system a useable range, and a sufficiently narrow beam width to provide the user with a meaningful location of potential threats. Fortunately, these requirements are complementary, so that the size and range of the system is limited primarily by the power, cost, and size budget of the intended platform (ground or air vehicle, fixed platform, man-portable, etc.).

Figure 8:
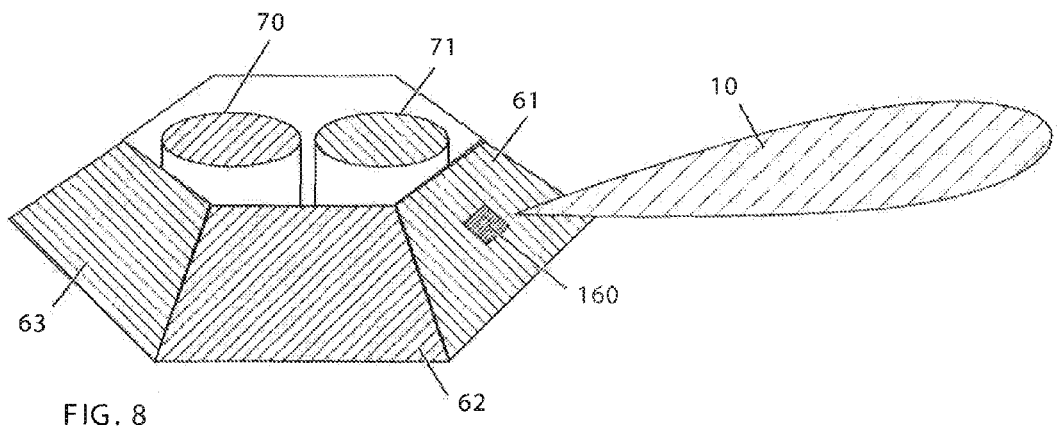
FIG. 8 is a plan-view schematic illustration of an antenna with high directivity, which is then arrayed in a configuration to sense in many directions

As an example, consider the antenna schematically illustrated in FIG. 8. The antenna is of a type known as a phased array, or electronically-steered aperture. The phased array transceiver electronics 70 are surrounded by a plurality of phased array panels, including a first phased array panel 61, a second phased array panel 62, a third phased array panel 63 and additional panels facing into the page in FIG. 8. Each panel is comprised of a plurality of individual radiating elements 160 that are configured in a manner that enables all of their element radiation patterns to combine into an array radiation pattern with high directivity as a primary antenna beam. Phased array antennas can preferentially aim the primary antenna beam in different directions according to electronic control signals. This critical function is addressed by an antenna control unit (71), which has the purpose of shaping and aiming the primary antenna beam towards a target with a proscribed level of gain and sidelobe levels using one or more techniques, including, but not limited to, those that are known in the art. The complex electrical and RF connections from the antenna control unit and transceiver electronics to each of the phased array panels are not illustrated for the purpose of clarity.

An example phased array antenna can have an azimuthal beam width of approximately 2° and an altitudinal beam width of approximately 5°. Such an antenna, when employing the current subject matter, can be capable of accurately locating a threat in terms of distance, as well as to +/−2° in azimuth and 5° in altitude. With practical engineering estimates, the directivity of this antenna can be calculated to be around 3240, with a likely gain of around 33 dB assuming radiating efficiency of around 0.6. The actual gain realized by the system will be less than this amount based on the antenna feed network, which would have to be optimized for a broadband antenna in the frequency range of interest.

In the example illustrated by FIG. 8, the antenna is designed around a 25 GHz center frequency. This would require a radiating area of around 0.054 m² to achieve this level of directivity assuming an aperture fill efficiency of 0.7 (typical values 0.6 to 1.0). If realized as a phased array panel, it might be used to scan one region of azimuthal coverage as part of a multi-panel threat detection system, such as the 60° example illustrated in the six-panel system of FIG. 8. As an engineering estimate based on planar patch array design, a passive phased array panel can achieve about 33 dB of antenna gain in a 50×20 element array, which at 0.6 wavelength between elements would be 0.52 m² in size, validating earlier calculations. A full multi-panel system would be about 1 to 2 m in diameter, or small enough to fit on an air or ground vehicle platform.

In a pulsed radar example, the receiver electronics may include the capability to integrate a plurality of received signals from the radar antenna in the frequencies of interest. This provides an intrinsic improvement in sensitivity, which may be desirable for systems implementing the methods of the presently discussed subject matter. The transmitter electronics may include the capability to create a plurality of pulsed signals, which are used in conjunction with the ability to integrate those received pulses at the receiver. Additional signal generation and signal processor electronics will also be part of the transceiver electronics, according to the state of the art known by those skilled in the area of radar system design.

The subject matter described herein may be embodied in systems, apparatus, methods, and/or articles depending on the desired configuration. In particular, aspects of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows described herein do not require the particular order shown, or sequential order, to achieve desirable results. Other embodiments may be within the scope of the following claim.

What is claimed is:

1. A method comprising:
   transmitting radio frequency signals towards a zone of interest from a first location, the zone of interest comprising at least one weapon, the transmitted frequency signals covering a range of frequencies that are propagated down at least one type of weapon barrel;
   receiving radio frequency signals reflected from the zone of interest;

comparing, by at least one programmable processor, the received radio frequency signals to a library of data characterizing a plurality of different weapons;

determining, by at least one programmable processor, based on the comparing, whether one or more weapons in the zone of interest are aimed at the first location or whether they are aimed at a different location; and providing, by at least one programmable processor, data characterizing at least one weapon in the zone of interest based on the comparison.

2. A method as in claim 1, further comprising: comparing, by at least one programmable processor, the received radio frequency signals to a library of radio frequency signatures for a plurality of different objects, wherein the radio frequency signatures characterize variances in phase and amplitude with both time and frequency due to radio frequency characteristics of the weapon.

3. A method as in claim 2, wherein the radio frequency signatures are derived, at least in part, empirically.

4. A method as in claim 2, wherein at least a portion of the radio frequency signatures are derived, at least in part, theoretically.

5. A method as in claim 2 further comprising:
estimating, by at least one programmable processor, a distance to the weapon; and
modifying, by at least one programmable processor, the received radio frequency signals based on a factor associated with the estimated distance;
wherein the comparing compares the modified received radio frequency signals to the radio frequency signatures for a plurality of different objects.

6. A method as in claim 2, wherein the radio frequency signatures each characterize variances in phase and amplitude with both time and frequency due to reflections associated with specific waveguide characteristics for a corresponding weapon barrel.

7. A method as in claim 2, wherein the library comprises data characterizing a fixed length of lossy transmission lines, the transmission line characterizing a steel circular waveguide of a firearm barrel and the fixed length characterizing a distance from a mouth of the firearm barrel to a chambered round.

8. A method as in claim 1, wherein the radio frequency signals are radar signals.

9. A method as in claim 1, wherein the transmitted radio frequency signals were generated with directivity greater than 10.

10. A method as in claim 1, wherein the weapon is a handheld firearm.

11. A method as in claim 10, wherein the firearm is selected from a group consisting of: 5.56 mm rifles, 7.62 mm rifles, and .50 caliber rifles.

12. A method as in claim 10, wherein the data characterizing the weapon identifies the location of the firearm.

13. A method as in claim 10, wherein the data characterizing the weapon indicates a range to the firearm.

14. A method as in claim 1, further comprising: processing, by at least one programmable processor, the received radio frequency signals to resolve and identify reflections associated with radiating antenna characteristics of a weapon.

15. A method as in claim 1, wherein an antenna for transmitting and/or receiving the radio frequency signals has a directivity characteristic between 100 and 100,000.

16. A weapon threat detection system comprising:
an outbound antenna apparatus that transmits, from a first location, an outbound radio frequency signal toward a potential threat in a zone of interest;
an inbound antenna that receives an inbound reflected radio frequency signal from the potential threat; and
at least one processor coupled to a data store, the data store storing a library of data characterizing a plurality of different weapons;
wherein the processor is configured to analyze the inbound reflected radar signals to determine whether the potential threat includes a weapon barrel pointed in the direction of the first location or whether the potential threat includes a weapon barrel pointed at a different location by comparing the inbound reflected radio frequency signal to the library of data characterizing the plurality of different weapons.

17. A system as in claim 16, wherein the weapon barrel is part of a handheld firearm.

18. A system as in claim 16 wherein the processor initiates notification to a user of the potential threat.

19. A system as in claim 18, wherein the processor initiates notification of a user of a location of the potential threat in relation to the inbound antenna.

20. A non-transitory computer program product storing instructions, which when executed by at least one data processor of at least one computing system, result in operations comprising:
initiating transmission of radio frequency signals towards a zone of interest from a first location, the zone of interest comprising at least one weapon, the transmitted frequency signals covering a range of frequencies that are propagated down at least one type of weapon barrel;
comparing received radio frequency signals reflected from the zone of interest to a library of data characterizing a plurality of different weapons;
determining, based on the comparing, whether one or more weapons in the zone of interest are aimed at the first location or whether they are aimed at a different location; and
providing data characterizing at least one weapon in the zone of interest based on the comparison.

21. A computer program product as in claim 20, wherein the operations further comprise: comparing the received radio frequency signals to a library of radio frequency signatures or patterns for a plurality of different objects, wherein the radio frequency signatures characterize variances in phase and amplitude with both time and frequency due to radio frequency characteristics of the weapon.

22. A computer program product as in claim 21, wherein the radio frequency signatures are derived, at least in part, empirically.

23. A system comprising:
means for transmitting radio frequency signals towards a zone of interest from a first location, the zone of interest comprising at least one weapon, the transmitted frequency signals covering a range of frequencies that are propagated down at least one type of weapon barrel;
means for receiving radio frequency signals reflected from the zone of interest;
means for comparing the received radio frequency signals to a library of data characterizing a plurality of different weapons; and
means for determining, based on the comparing, whether one or more weapons in the zone of interest are aimed at the first location or whether they are aimed at a different location; and
means providing data characterizing at least one weapon in the zone of interest based on the comparison.

* * * * *